June 26, 1956 R. H. BOWDEN 2,752,563
ELECTRONIC TUBE FILAMENT CONTINUITY TESTER
Filed Feb. 2, 1955

Inventor
Ralph H. Bowden
By Silverman + Mullin
Attorneys

United States Patent Office 2,752,563
Patented June 26, 1956

2,752,563

ELECTRONIC TUBE FILAMENT CONTINUITY TESTER

Ralph H. Bowden, Chicago, Ill.

Application February 2, 1955, Serial No. 485,664

7 Claims. (Cl. 324—22)

This invention relates generally to tube testers and more particularly is concerned with the construction of a novel and improved substantially universal tester especially for ascertaining the continuity of the filaments of electronic tubes.

The particular problem which is attacked by the apparatus of this invention is the increasing practice by manufacturers of television and radio equipment to connect the filaments of a great number of electronic tubes in series. Thus, many television receiving sets have the tube filaments connected in banks of sixteen or seventeen tubes, the tubes of each bank being all connected in series. The burning out of any one filament therefore de-energizes all of the others in the bank, and it is required to check all filaments to find the open one. The same problem exists in the familiar series bank of Christmas tree lights (and the solution to that problem, incidentally, is capable of solution by this invention as well).

Accordingly, the serviceman conveniently should have a very small and compact tube tester which he can carry with him and with which he can make a check of tube filaments immediately.

This invention contemplates the provision of such apparatus, but simpler, more compact, more versatile and more useful than others, this being a principal object.

Practically all tubes in use in radio and other electronic equipment in the United States today will fit into one of four different sockets. The tubes are classed as "octal" base having eight pins, "loctal" base having eight pins, nine pin miniatures, and seven pin miniatures. The filament connections are such that a simple circuit has been worked out for all tubes but those designed for the octal sockets. This type of tube has three different filament connections. These are pair permutations of three specific pins, and obviously there will be one type which will not be capable of connection because of the short circuit existing between the particular terminals.

Specifically, octal tubes use filaments connected to the pins in three ways, No. 2 to No. 8, No. 2 to No. 7, and No. 7 to No. 8. Since most tubes are of the variety No. 2 to No. 7 and No. 7 to No. 8, one side of the testing circuit is connected logically to terminal No. 7 of the octal socket and the other side connected to both No. 2 and No. 8. The third type however, requiring connection across Nos. 2 and 8 finds terminals 2 and 8 shorted together. Obviously tubes of the No. 2 to No. 8 pin variety cannot be tested by ordinary methods, and thus, all filament continuity testers on the market thus far have, to the best of my knowledge, either not made provision for testing tubes of the No. 2 to No. 8 pin variety with octal base. In expensive and large equipment, separate circuits are used to test this particular type tube.

Probably the most important object of the invention is to provide a tube tester which will enable the same octal socket to be used to test all octal base tubes for filament continuity.

Still another object of the invention is to provide a safe and shock-proof tube filament tester which can be used by servicemen through the use of their interlock extension cords; which provides a voltage tester; which provides a continuity tester; and which uses a novel circuit for indicating the results of the particular test.

With the foregoing and other objects in view which will appear more fully as the description of the invention proceeds, I have illustrated a particular embodiment of the invention, which is preferred, and I have set forth all of the details thereof in order to render the specification clear and easy to understand.

Figure 1:
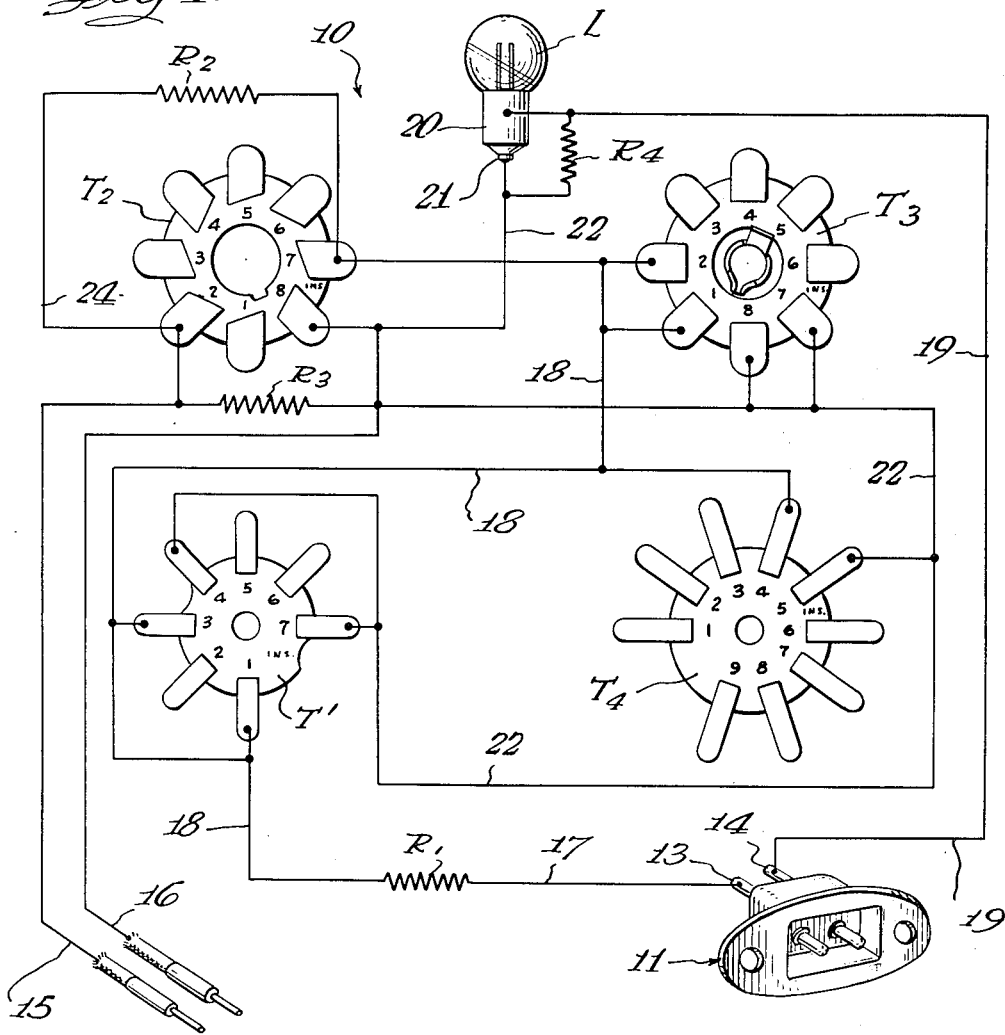
Fig. 1 is a semi-diagrammatic circuit representation of an electronic tube filament continuity tester, the tube socket diagrams being viewed from their bottoms.

As indicated in the previous discussion the principal problems with prior devices of this kind have been the shock hazard when operating the device from a wall outlet, the lack of ability to test all tubes, the large size and complexity of construction and operation, and the need for augmenting the device with continuity and voltage testing equipment. The elimination of all these problems is accomplished by a novel circuit using the principles of voltage division combined with the characteristics of a gas discharge tube in a very small and compact device.

The commercial device of the invention is actually mounted on a small sheet metal box one inch thick and 3" by 4" in plan. Since the circuit can be combined with any other instruments or mounted on any desirable chassis there is no need for illustrating any mounting means. Thus, the reference character 10 designates the device generally which has four electronic tube sockets $T_1$, $T_2$, $T_3$ and $T_4$ to enable a test of the continuity of filaments of any of the ordinary electronic receiving tubes in use today. The connections between socket terminals will be described but suffice it to say at this time that the socket $T_1$ is intended to accept seven-pin miniature tubes; the socket $T_2$ is intended to accept eight-pin tubes of conforming base, this type of socket being known as an "octal"; the socket $T_3$, known as a "loctal" type, is designed to engage with the base of an eight-pin tube of still another design; and the fourth socket $T_4$ is designed to accept nine-pin miniature tubes.

In the circuit 10 there is included a gaseous discharge device comprising a neon lamp L of conventional construction, the ignition of which is used as an indication of continuity.

The circuit is energized from a 115 volt A. C. line through a connector socket 11 of the type principally used as an interlock switch on television receivers. The modern serviceman carries in his kit an extension cord having the conventional male-pronged plug on one end, to fit the conventional wall outlet, and a plug with female contacts on the other end to fit the interlock socket of television receivers. This cord is called a "cheater" in the vernacular and since its use is practically universal, the device 10 need only provide the socket 11 without an extension cord.

The socket 11 has terminals 13 and 14 which connect with the circuit to provide energization for all tube filaments of electronic tubes inserted in sockets $T_1$, $T_2$, $T_3$ or $T_4$. The device provides a continuity and voltage test as well, and for this purpose there is provided an externally accessible pair of leads 15 and 16 with suitable test prod ends.

Next considering the circuit, the terminal 13 is connected by a lead 17 to a series resistor $R_1$ and from $R_1$ another lead 18 extends to all sockets. It will be seen that lead 18 connects with the following:

Terminals 1 and 3 of socket $T_1$
Terminal 7 of socket $T_2$
Terminals 1 and 2 of socket $T_3$, and
Terminal 4 of socket $T_4$.

The other terminal 14 is connected by lead 19 to the base 20 of lamp L. Across the base 20 and tip 21 there is a resistor $R_4$.

The tip 21 of the lamp L is connected to a lead 22 which connects with the following:

Terminals 4 and 7 of socket $T_1$
Terminal 8 of socket $T_2$
Terminals 7 and 8 of socket $T_3$ and
Terminal 5 of socket $T_4$ Lead 22 also connects with test lead 16.

Two resistors complete the circuit, the resistor $R_2$ being connected across terminals 2 and 7 of socket $T_2$ and the resistor $R_3$ being connected across terminals 2 and 8 of the same socket. For convenience the lead between terminal 2 and $R_3$ will be designated 24.

Consider first the sockets $T_1$, $T_3$ and $T_4$. $T_1$ is intended to accept television receiver tubes such as 6AU6, 6CB6, 6AL5 and similar 6 volt filament miniatures whose filament is connected between pins 3 and 4. The same socket will accommodate receiver tubes like 1L4 and 1L6 whose filament is connected across pins 1 and 7. The socket $T_3$ will accommodate tubes of the 8 pin variety such as 7B4, 7C5 and 7C4 in which the filament is connected between pins 8 and 1; and tubes such as 7E5 in which the filament is connected to pins 8 and 2.

The socket $T_4$ will accommodate tubes of the nine pin miniature variety such as 12AT7, 12AU7 and the like in which the filament is connected across the pins 4 and 5 with a center tap at 9.

Figure 2:
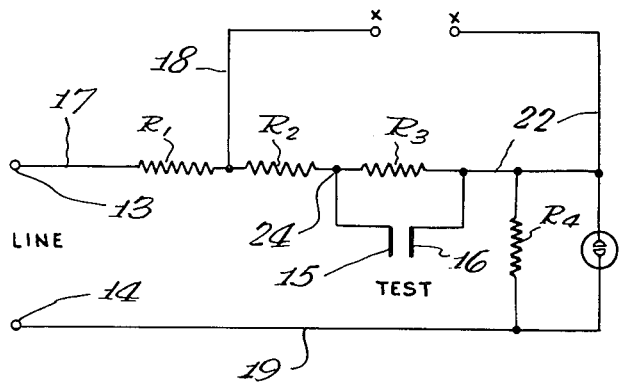
Fig. 2 is a highly simplified circuit diagram of the tester.

Considering only these three sockets, the problem of testing filament continuity is solved in the same way. In the circuit 10 the filament terminals are connected so that any tube which is inserted in its appropriate one of these three sockets will automatically have its filament connected in series with the resistor $R_1$ while being in parallel with the resistors $R_2$ and $R_3$ connected together in series, and the neon lamp L with its shunting resistor $R_4$ being in series also, since the combination is connected between lead 19 and lead 22. The use of any of the sockets $T_1$, $T_3$ and $T_4$ for testing is the same as connecting the filament of the suspect electronic tube at the terminals $xx$ of Fig. 2.

This circuit is desirable because there is always such a combination of impedances in the circuit as to prevent a shocking potential to exist in the circuit. Since the filament of the usual tube is of low impedance, the effect of connecting a good tube filament across the terminals $xx$ is the same as a direct connection. The overall impedance of the circuit is chosen so the voltage from lead 22 to lead 19 is normally insufficient to ignite the lamp L. When however the resistors $R_2$ and $R_3$ are shorted out, the total circuit voltage is divided between $R_1$ and the combination of the lamp L and its resistor $R_4$. The ignition of the lamp L therefore signifies that the filament of the tested tube is good.

With the circuit as thus far described, using the test leads 15 and 16 could be the same as connecting a good electronic tube into any of sockets $T_1$, $T_3$ or $T_4$. In other words, the leads 15 and 16 could just as easily be connected across leads 18 and 22. Instead, however, it is noted that the leads are connected only across one of the resistors $R_3$. The operation of the resistors $R_2$ and $R_3$ will be explained, but suffice it to say here that the shorting of only one of these resistors decreases the current that flows through the test leads during their use as a continuity checker.

The values of the resistors $R_2$ and $R_3$ are chosen with relation to the remainder of the circuit so that the short circuiting of either one will so divide the voltage that the voltage across the lamp L will be sufficient to ignite the same. This is the most important feature of the invention because it enables the testing of tubes of the type 5U4, 5V4, 5W4 and 5Y3 without the need for added special circuits.

The tube socket $T_2$ accepts tubes of the so-called octal type. The filaments of tubes like 6SK7 and 6V6 are connected between pins 2 and 7. The filaments of tubes like 6SN7 and 6SQ7 are connected between pins 7 and 8. It would seem logical to connect socket terminals 2 and 8 together and then connect each side of the testing terminals to the respective connections. But, the same socket must accept the tubes above mentioned, that is 5U4, 5V4 and the like which have their filaments connected between pins 2 and 8. Since the logical way of connecting the socket has terminals 2 and 8 connected together, this is a short circuit across the filament insofar as these five volt tubes are concerned. Thus, unless some manner of opening the lead between terminals 2 and 8 of the octal socket $T_2$ is provided, or there is a special circuit, the tube checker is not universal. Even if there is a switch or a separate circuit provided, the serviceman must refer to special instructions and examine each tube before using the checker.

As previously stated, with the circuit of the invention the serviceman need not worry or refer to any lists. All tubes of the octal base type are accepted and properly tested by the invention. This is accomplished by providing a circuit in which through the arrangement of a voltage divider, any of the permutations of the three terminals will operate. In other words, a tube filament connected across any two, if continuous will result in the ignition of the lamp.

The resistor $R_2$ is connected in lead 24 across the terminals 2 and 7 of $T_2$ and the resistor $R_3$ is connected between terminals 2 and 8. The division of voltage in the circuit is such that with either $R_2$ or $R_3$ or $R_2$ and $R_3$ short circuited, the lamp L will ignite. The insertion of a tube having its filaments connected to pins 7 and 8 is the same as connecting the tube pins to the terminals $xx$. Where terminals 2 and 7 are used, $R_2$ is shorted out and where terminals 2 and 8 are used $R_3$ is shorted out.

The commercial version of the invention used a neon lamp designated NE-51 by the manufacturer (General Electric Co. of Nela Park, Ohio) having an ignition voltage of approximately 45 to 65 volts A. C. This voltage varies from lamp to lamp, which sometimes requires slight changes in the circuit constants. The lamp is rated at one twenty-fifth of a watt. Its impedance in an alternating current circuit is in the neighborhood of 25,000 ohms with variations perhaps to 60,000 ohms. This figure is somewhat uncertain due to the nature of the discharge device, same being a constant potential apparatus, and operating at a voltage less than its ignition voltage.

The resistor $R_4$ was chosen at 330,000 ohms, $R_2$ and $R_3$ at 270,000 ohms each, and the resistor $R_1$ was 68,000 ohms. With these constants, let us compute the voltage division, neglecting the minor variations due to the use of A. C. voltage. Considering the line voltage as 115, with no tubes in place, the voltage across resistor $R_4$ is about 31 volts, insufficient to ignite the lamp. With the resistor $R_2$ or $R_3$ shorted out, the voltage rises to about 55 volts, which is usually sufficient. With resistors $R_2$ and $R_3$ both shorted out the voltage across resistor $R_4$ is about 95 volts, which is quite enough to ignite the lamp.

Obviously the device 10 has greater utility than other filament testing apparatus because of its versatility in being able to test all of the usual tubes. The device can function as a voltage testing apparatus by short circuiting the leads 13 and 14 and using the test leads 15 and 16 as prods. Considering the same circuit constants as given in the example above, any voltage over approximately 111 volts applied to the test leads 15 and 16 will be sufficient to ignite the lamp L.

No further discussion of the invention is believed necessary, since it is felt that those skilled in this art will appreciate the advantages and benefits from the description thus far. Some variation is, of course capable of being made without departing from the spirit of the invention as described herein and defined in the claims, although the particular problems are peculiar to the electronic tube situation in the United States where substantially all tubes popularly use will fit into the four sockets enumerated. In situations where a single socket is used to test the filaments of tubes which are connected as the tubes which fit in socket T₂ variations of the proportions of the constants of the circuit are not likely to be made. The requirements of different kinds of indicating devices will dictate other values of the circuit constants and their proportions. The advantage of the neon or gaseous discharge device is that its impedance is quite high until ignition occurs.

What it is desired to secure by Letters Patent is:

1. Apparatus for testing continuity of electronic tube filaments comprising, a conventional A. C. line, a plurality of voltage dropping resistors and a lamp igniting resistor, all resistors being in series and connected across the line, a gaseous discharge device connected across said lamp igniting resistor, the ratio of resistance of the said lamp igniting resistor to the total resistance of all resistors being less than the ratio of ignition voltage of said discharge device to the line voltage, a plurality of tube sockets adapted to accommodate electronic tubes of various types therein, said tube sockets having filament terminals engaged by the pins of inserted tubes, and connections from said terminals to the said voltage dropping resistors so that the insertion of a tube with a continuous filament in any socket will short circuit at least one of said voltage dropping resistors and increase the resistance ratio at least to ignition voltage ratio, one of said sockets adapted to accommodate three different types of tubes the filaments of which are respectively connected to pairs of pins which are permutations of three pins.

2. Apparatus for testing continuity of electronic tube filaments comprising, a conventional A. C. line, a plurality of voltage dropping resistors and a lamp igniting resistor, all resistors being in series and connected across the line, a gaseous discharge device connected across said lamp igniting resistor, the ratio of resistance of the said lamp igniting resistor to the total resistance of all resistors being less than the ratio of ignition voltage of said discharge device to the line voltage, a plurality of tube sockets adapted to accommodate electronic tubes of various types therein, said tube sockets having filament terminals engaged by the pins of inserted tubes, and connections from said terminals to the said voltage dropping resistors so that the insertion of a tube with a continuous filament in any socket will short circuit at least one of said voltage dropping resistors and increase the resistance ratio at least to ignition voltage ratio, one of said sockets adapted to accommodate three different types of tubes the filaments of which are respectively connected to pairs of pins which are permutations of three pins, said voltage dropping resistors including two connected respectively between two different pairs of the filament terminals of said one socket so that no short circuits exist between any two of the filament terminals.

3. A tester as described in claim 2 in which there is a pair of continuity testing leads across one of said two voltage dropping resistors.

4. Apparatus for testing continuity of electronic tube filaments comprising, a conventional A. C. line, a plurality of voltage dropping resistors and a lamp igniting resistor, all resistors being in series and connected across the line, a gaseous discharge device connected across said lamp igniting resistor, the ratio of resistance of the said lamp igniting resistor to the total resistance of all resistors being less than the ratio of ignition voltage of said discharge device to the line voltage, a plurality of tube sockets adapted to accommodate electronic tubes of various types therein, said tube sockets having filament terminals engaged by the pins of inserted tubes, and connections from said terminals to the said voltage dropping resistors so that the insertion of a tube with a continuous filament in any socket will short circuit at least one of said voltage dropping resistors and increase the resistance ratio at least to ignition voltage ratio, one of said sockets being an octal type and having three filament terminals, said voltage dropping resistors including two connected respectively between two separate filament terminals and a common terminal.

5. Apparatus for testing continuity of electronic tube filaments comprising, a conventional A. C. line, a plurality of voltage dropping resistors and a lamp igniting resistor, all resistors being in series and connected across the line, a gaseous discharge device connected across said lamp igniting resistor, the ratio of resistance of the said lamp igniting resistor to the total resistance of all resistors being less than the ratio of ignition voltage of said discharge device to the line voltage, a plurality of tube sockets adapted to accommodate electronic tubes of various types therein, said tube sockets having filament terminals engaged by the pins of inserted tubes, and connections from said terminals to the said voltage dropping resistors so that the insertion of a tube with a continuous filament in any socket will short circuit at least one of said voltage dropping resistors and increase the resistance ratio at least to ignition voltage ratio, one of said sockets being an octal type and having one of said series resistors being connected between terminals 2 and 7, and another of said series resistors being connected between terminals 2 and 8.

6. Apparatus for testing continuity of electronic tube filaments comprising a conventional A. C. line, a plurality of voltage dropping resistors, all resistors being in series and connected across the line, a gaseous discharge device connected in circuit with said resistors, in series with at least one and in parallel with at least another, the ratio of resistance of the parallel resistor with the total resistance of all resistors having a predetermined relation to ratio of ignition voltage of said gaseous discharge device to line voltage such as to establish a first visible condition of energization of said discharge device, said tube sockets having filament terminals engaged by the pins of inserted tubes, and connections from said terminals to said voltage dropping resistors so that the insertion of a tube in any socket will short circuit at least one of said voltage dropping resistors and change the predetermined relation to establish a second visible condition of energization of said device, one of said first and second conditions being ignition and the other being extinguishment, one of said sockets adapted to accommodate three different types of tubes the filaments of which are respectively connected to pairs of pins which are permutations of three pins.

7. Apparatus for testing continuity of electronic tube filaments comprising a conventional A. C. line, a plurality of voltage dropping resistors, all resistors being in series and connected across the line, a gaseous discharge device connected in circuit with said resistors, in series with at least one and in parallel with at least another, the ratio of resistance of the parallel resistor with the total resistance of all resistors having a predetermined relation to ratio of ignition voltage of said gaseous discharge device to line voltage such as to establish a first visible condition of energization of said discharge device, said tube sockets having filament terminals engaged by the pins of inserted tubes, and connections from said terminals to said voltage dropping resistors so that the insertion of a tube in any socket will short circuit at least one of said voltage dropping resistors and change the predetermined relation to establish a second visible condition of energization of said device, one of said first and second conditions being ignition and the other being extinguishment, one of said sockets adapted to accommodate three different types of tubes, the filaments of which are permutations of three pins, said voltage dropping resistors including two connected respectively between two different pairs of filament terminals of said one socket so that no short circuits exist between any two of the filament terminals.

References Cited in the file of this patent

UNITED STATES PATENTS

| | | |
|---|---|---|
| 2,014,379 | Hockner | Sept. 17, 1935 |
| 2,645,754 | Pitinsky | July 14, 1953 |
| 2,717,190 | Shoup | Sept. 6, 1955 |